United States Patent [19]

Roth

[11] Patent Number: 5,065,389

[45] Date of Patent: Nov. 12, 1991

[54] INFORMATION RECORDING AND READ DEVICE, INFORMATION RECORDING DEVICE, AND RECORD CARRIER OBTAINED BY MEANS OF ONE OF THE DEVICE

[75] Inventor: Rudolf Roth, Eindhoven, Netherlands

[73] Assignee: U.S. Philips Corporation, New York, N.Y.

[21] Appl. No.: 521,068

[22] Filed: May 8, 1990

[30] Foreign Application Priority Data

Aug. 24, 1989 [NL] Netherlands .................. 8902136

[51] Int. Cl.$^5$ .................. G11B 5/09; G11B /13/04
[52] U.S. Cl. .................................. 369/48; 369/59
[58] Field of Search .................. 369/47–49, 369/59

[56] References Cited

U.S. PATENT DOCUMENTS 4,817,077 3/1989 Ono .................................. 369/48
4,916,680 4/1990 Oldham .......................... 369/48

*Primary Examiner*—Vincent P. Canney
*Attorney, Agent, or Firm*—Leroy Eason

[57] ABSTRACT

The present Patent Application relates to an information recording and read device for recording and reading information on/from an inscribable record carrier, (4; 11) of a write-once type, in which the recorded information includes redundancy for the purpose of error correction. The device comprises recording means (1, 2, 3; 12,15,16) for recording an information pattern which is representative of the information to be recorded in a track on the record carrier (11), read means (5, 6, 7; 12,14, 16) for converting the information pattern into an information signal (Vi), and control means for controlling the recording and/or read process on the basis of the control information in the track. The read means comprises a correction circuit (7; 17) for correcting errors in the information signal on the basis of the redundancy in the information and for suppressing the information signal if the correction circuit is not capable of correcting the errors. The device further comprises means (8; 24, 25) for partly mutilating the recorded information pattern in a selected part of the track in such a manner that in the selected part of the track portions with a mutilated information pattern and portions with an undamaged information pattern alternate with each other in a manner such that control on the basis of the control information in the track remains possible but the error correction circuit (7; 17) is no longer capable of correcting the errors.

20 Claims, 2 Drawing Sheets

INFORMATION RECORDING AND READ DEVICE, INFORMATION RECORDING DEVICE, AND RECORD CARRIER OBTAINED BY MEANS OF ONE OF THE DEVICE

BACKGROUND OF THE INVENTION

1. Field of the Invention

The present invention relates to an information recording and read device for recording information on or reading information from an inscribable record carrier of a write-once type, wherein the recorded information is suitable for redundancy enabling error correction to be applied. The invention further relates to a record carrier obtained by means of such a device.

2. Related Art

Such a device and such a record carrier are generally known from EP-A 0,265,984. A problem which arises, when, for example, audio or video signals are recorded is that a fault such as the recording of an undesirable signal cannot be corrected because the record carrier cannot be overwritten.

SUMMARY OF THE INVENTION

It is an object of the invention to provide a device which mitigates this drawback. To this end, the device as generally defined in the foregoing is further defined as having read means comprising a correction circuit for correcting, on the basis of the redundancy in the information, the errors in the information being read and for suppressing the information signal in the case that the correction circuit is not capable of correcting the errors. The device also comprises means for partly mutilating the recorded information pattern in a selected part of the track in such a manner that in the selected part of the track portions with a mutilated information pattern and portions with an undamaged information pattern alternate with each other in a manner such that control on the basis of the control information in the track remains possible but the error correction circuit is no longer capable of correcting the errors.

The invention is based, inter alia, on the recognition of the fact that if the information pattern is partly mutilated the control information that can still be derived from this information pattern is mutilated completely. This is not the case in the event of a completely mutilated information pattern. By suppressing the information signal in the case of an incorrigible number of errors, it is achieved that undesirable recorded information is masked completely during reading.

In this respect it is to be noted that, in itself, suppression of the information signal in the case of an incorrigible number of errors is already employed in commercially available CD players.

The track on the record carrier is often provided with distinguishable control patterns, such as for example the EFM synchronization pattern in a recorded standard CD signal. These synchronization patterns are used for synchronizing the read process. In order to prevent the synchronization of the read process from being disturbed while the track portion containing the mutilated information patterns is scanned, it is preferred to mutilate only those information pattern portions which are situated between the control patterns. In that case synchronization is maintained while the track portion with the partly mutilated information patterns is scanned, so that the synchronization need not be restored when a track portion with nonmutilated information patterns is reached.

An illustrative embodiment which is attractive because of its simplicity is characterized in that the control patterns are situated at equidistant positions in the track, in that the means for mutilating the information patterns comprise means for scanning the track with a linear scanning velocity and for mutilating information-pattern portions which are scanned in predetermined time intervals after detections of the control patterns.

Although the invention is not limited to devices for recording and reading CD signals, it is very advantageous to use the invention for this purpose because error correction circuits which in the case of an incorrigible number of errors suppress the information signal being read are generally employed in CD players, so that the record carrier obtained by means of the foregoing embodiment of the recording device can be played on CD players already on the market without the signal reproduction being disturbed to an annoying extent.

From the foregoing it will also be evident that the invention is not limited to combined recording and read devices but that it may also be applied to devices constructed exclusively for information recording.

When the invention is used for recording CD signals, it is preferred to destroy those parts of the information pattern which represent the error correction symbols because the influence of incorrect error correction symbols on the error correction is greater than the influence of incorrect data symbols.

BRIEF DESCRIPTION OF THE DRAWING

The invention will now be described in more detail, by way of example, with reference to FIGS. 1 to 5, in which.

DETAILED DESCRIPTION OF THE PREFERRED EMBODIMENTS

Figure 1:
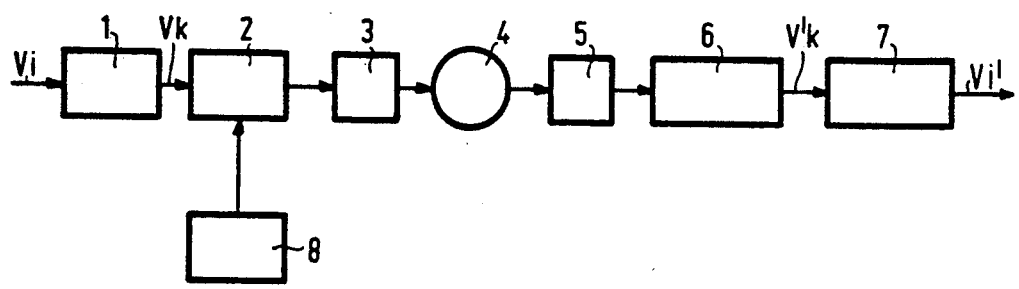
FIGS. 1 and 2 illustrate embodiments of devices in accordance with the principles of the present invention.

FIG. 1 shows diagrammatically a first illustrative embodiment of a device for recording and reading information in accordance with the invention. A coding circuit 1 converts information signal Vi, for example an audio and/or a video signal, into a code signal Vk of a format suitable for recording, which code signal Vk comprises redundant information, for example in the form of error correction bits, for the purpose of error correction. The code signal Vk is applied to a control circuit 2 for controlling a write head 3 in such a way that an information pattern corresponding to the code signal Vk is formed on an inscribable record carrier 4 of a write once type. The information thus recorded can be read by scanning the information pattern by means of a read head 5, resulting in a detection signal in conformity with the information pattern being scanned. The code signal is reconstructed from this detection signal by means of a signal processing circuit 6. The reconstructed code signal Vk' is applied to a decoding and error correction circuit 7, which recovers the original information signal from the reconstructed code signal.

The recovered information signal bears the reference Vi'. The remaining portion of the circuit 7 is of a customary type which corrects possible errors in the code signal using the redundancy in the code signal Vk'. The circuit 7 also comprises a signal suppressor which suppresses the output signal Vi' of the circuit 7 in the case that the number of errors in the reconstructed code signal Vk is so large that the circuit 7 is no longer capable of recovering the original information signal. The problem in recording on record carriers of the write-once type is that a recording error, such as for example recording of an undesired portion of the information signal, cannot be corrected. However, it is possible to mutilate an information pattern already recorded in such a manner that the number of errors during reading is so large that the circuit 7 is no longer capable of reconstructing the original information signal and consequently suppresses the read signal Vc' on its output. As a result of this, the undesired signal portion is, in effect, masked and is therefore no longer perceptible during reproduction of the information being read. Since the information pattern generally comprises control information for controlling the read process, for example for synchronising purposes, it is desirable that when the information pattern is mutilated this pattern is not mutilated over the entire length of the track, but that portions with a non-mutilated information pattern remain available between the portions with a mutilated information pattern, in order to maintain control while the track containing the partly mutilated information pattern is read. Moreover, the mutilation of the information pattern may adversely affect the tracking during scanning of information patterns recorded in a servo track. Mutilation over the entire length of the track is found to give rise to tracking failure during scanning.

In accordance with the invention, the information pattern should be mutilated so as to obtain undamaged portions of the information pattern which alternate with mutilated portions of the information pattern.

Such a mutilated information pattern can be obtained in that an information pattern already recorded is scanned a second time by the write head and the write head is activated temporarily at regular intervals, so that locally a second information pattern is superposed on and thereby mutilates the original information pattern. In order to achieve this the device shown in FIG. 1 comprises a switchable circuit 8 which is its on-state alternately activates and deactivates the control circuit 2 of the write head 2.

It is to be noted that in the case that the recorded information pattern comprises control patterns, for example for synchronizing purposes, the information patterns are preferably mutilated in those parts which are situated between the control patterns.

An illustrative embodiment in which this is realised will now be described in detail with reference to FIG. 2, which shows a device for recording and reading standard CD signals on an optically inscribable record carrier 11 of a write-once type. Such a record carrier comprises a radiation-sensitive layer which upon exposure to radiation of suitable energy is subjected to an irreversible optically detectable change. Such an information layer may be, for example, a layer of a radiation-sensitive dye, a thin metal layer, or a material whose structure changes from amorphous to crystalline or vice versa upon exposure. On such a record carrier the information can be recorded by scanning a track with a radiation beam modulated in conformity with an information signal, which results in an information pattern representing the information to be recorded.

An example of such a record carrier is described in detail in EP-A 0,326,206, herewith incorporated by reference.

Figure 2:
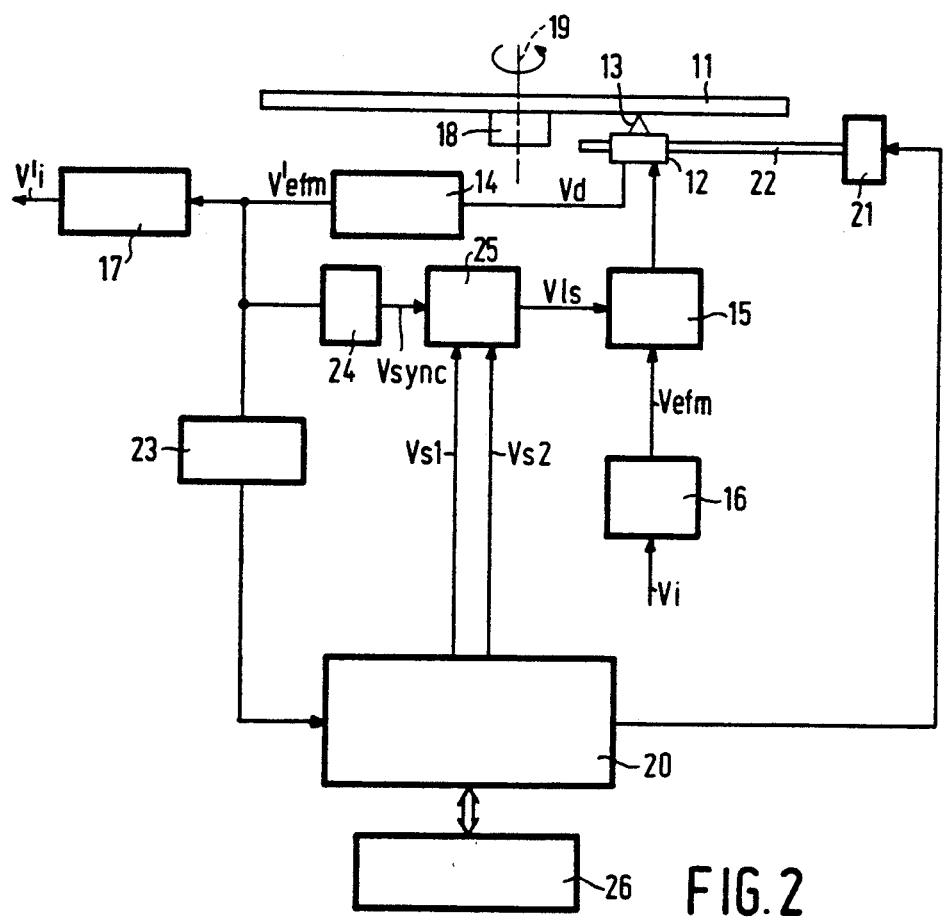

The device shown in FIG. 2 comprises drive means, for example in the form of a drive motor 18, for rotating the record carrier 11 about an axis 19. An optical write/read head 12 of a customary type is arranged opposite the rotating record carrier 11 and comprises a laser and an optical system for focussing a scanning beam 13 and the record carrier 11. Under control of a control unit 20 the read/write head 12 is movable in a radial direction relative to the rotating record carrier 11 by means of an actuating system, for example a motor 21 and a spindle 22. For the purpose of recording, the device comprises a customary coding circuit 16 for converting the information signal Vi, for example an audio signal, into an EFM modulated signal Vefm in conformity with a CD format prescribed by a CD standard.

Figure 3:
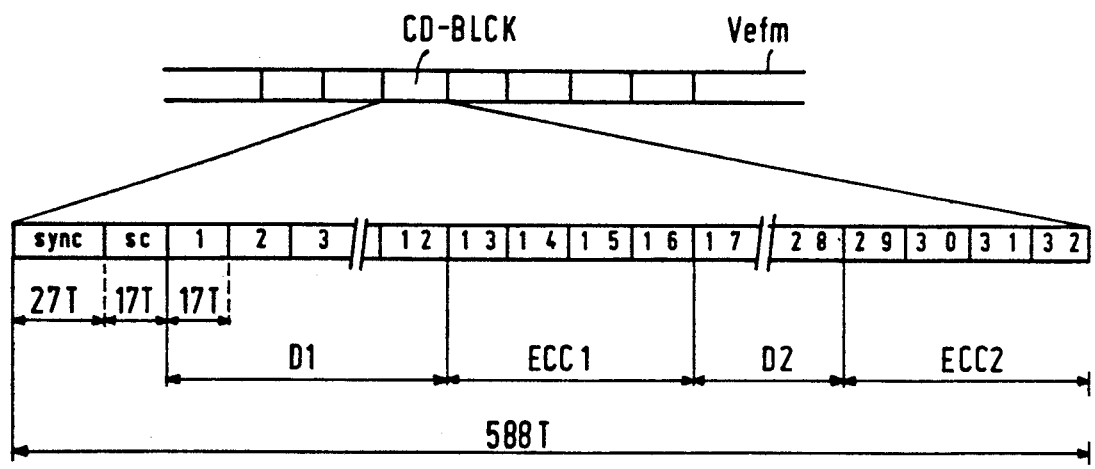
FIG. 3 represents the format of an EFM modulated signal formatted in conformity with the CD standard.

By way of illustration the standard CD format is represented diagrammatically in FIG. 3. A, EFM modulated signal in conformity with the standard CD format is divided into blocks CD-BLCK, each comprising 588 time units T. Of these time units, twenty seven units are utilized for a unique EFM synchronization symbol SYNC, which is situated at the beginning of each block CD-BLCK. The remainder of each block is divided into 33 EFM symbols each having a length of seventeen time units T, each EFM symbol representing an 8-bit information byte. The EFM symbol SC which directly follows the EFM synchronization symbol SYNC represents a subcode byte, which is employed inter alia for specifying an absolute time code. The block CD-BLCK further comprises, in succession, twelve odd EFM-DATA symbols D1, four EFM symbols ECC1 for the purpose of error correction, twelve even EFM-DATA symbols D2, and four EFM symbols ECC2 also for error correction purposes.

The EFM modulated signal Vefm is applied to a laser control circuit 15, which controls the intensity of the laser in the read/write head 12 depending on the EFM modulated signal Vefm and on a control signal Vls, which indicates whether the read/write head 12 is to be operated in a write mode or in a read mode. If the signal Vls, for example by means of the logic value "1", indicates that the read/write head 12 is to be operated in the write mode, the laser control circuit 15 switches the intensity of the laser in conformity with the EFM modulated signal between a low level, for which there is no change in the recording layer of the record carrier 11, and a high level, for which the recording layer is subjected to an irreversible change. If the signal Vls, for example by means of the logic value "0", indicates that the read/write head 12 is to be used in the read mode, the laser control circuit 15 sets the laser intensity to a constant low value which does not give rise to a change in the recording layer.

The purpose of reading the write/read head 12 comprises an optical detection system for detecting the radiation reflected from the recording layer of the record carrier 11 when an information pattern formed on the recording layer is scanned. A signal Vd, which is indicative of the detected radiation, is applied to a signal processing circuit 14, which reconverts the signal Vd into a bivalent EFM modulated signal V'efm which is representative of the information pattern being read.

The signal V'efm is applied to a customary EFM decodingr and error correction circuit 17, which in conformity with the conversion rules prescribed by the CD standard converts the signal V'efm into a reconstructed information signal V'i. Possible errors in the signal V'efm are detected and corrected with the aid of the EFM symbols ECC1 and ECC2 provided for the purpose of error detection. The circuit 17 further comprises customary signal suppression means, which suppress the output signal V'i if the circuit 17 is no longer capable of correcting the errors in the signal V'efm.

The signal V'efm is further applied to a subcode detector 23, which extracts the subcode information from the signal V'efm and applies it to the control unit 20.

Finally, the signal V'efm is applied to a customary symbol detector 24 for detecting the EFM synchronisation symbols in the signal V'efm. The symbol detector 24 is responsive to a detection of an EFM synchronisation symbol to supply a pulse-shaped synchronising signal Vsync to a circuit 25 for supplying the control signal Vls. The control unit 20 supplies two logic control signals Vs1 and Vs2 to the circuit 25. The signal Vs2 indicates, for example by means of a logic "1" level, that the device is to be operated in the write mode. The signal Vs1 indicates, for example by a logic "1" level, that the device is to be operated in an information-pattern-mutilation mode.

In response to a logic "1" level of the control signal Vs1 the circuit 15 sets the laser control circuit, by means of the control signal Vls, to the mode in which the intensity of the radiation beam is switched between a high and a low level in conformity with the signal Vefm.

Figure 4:
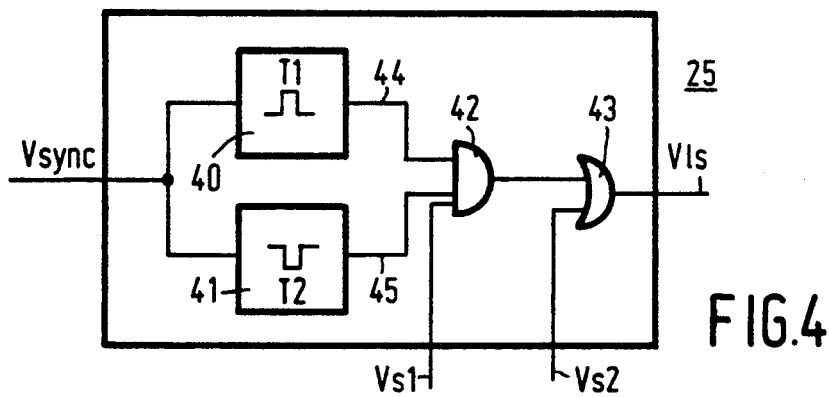
FIG. 4 shows in detail an example of a circuit for use in the device in accordance with the invention.

In the information-pattern-mutilation mode the control signal Vls briefly sets the laser control circuit 5, in response to the signal Vsync, to the mode in which the intensity of the laser is switched between the low level and the high level in conformity with the signal Vefm. FIG. 4 shows an example of the circuit 25. The circuit 25 comprises two monostable multivibrators 40 and 41 having different delay times T1 and T2, the multivibrator 40 generating a positive pulse and the multivibrator 41 generating a negative pulse. Together with the signal Vs1 the outputs of the multivibrators 40 and 41 are applied to an AND gate 42. Together with the signal Vs2 the output signal of the AND gate 42 is applied to an OR gate 43. The output signal of the OR gate 43 constitutes the control signal Vls. The information-pattern-mutilation mode described hereinbefore enables an information pattern already recorded to be mutilated partly.

The device of FIG. 2 operates as follows. If an information signal is to be recorded in a specific area of the record carrier the read/write head 12 is brought to the desired position in a customary manner, for example as described in EP-A No. 0,326,206, by means of the motor 21 and the spindle 22 under control of the control unit 20. When the desired position is reached the read/write head 12 is set to the write mode by the control unit by means of the signal Vs2, after which recording is started. If a user of the device now wishes to mask a specific portion of the recorded information by mutilating the corresponding information pattern the necessary data can be entered into the control unit 20 with the aid of customary entry means, for example, a keyboard 26. This is possible, for example, by entering the absolute time codes of the beginning and the end of the information pattern to be mutilated. After entry of the data relating to the beginning and the end of the portion to be mutilated the read/write head 12 is brought to the beginning of the portion to be mutilated in a customary manner, the beginning being detected by means of the subcode information supplied by the subcode detector, which information comprises the absolute time code of the signal being read. Once the beginning is reached the device is set to the information-pattern-mutilation mode by means of the control signal Vs1, after which the write/read head 12 is set temporarily to the write mode in response to every EFM synchronisation symbol in the signal Vefm' being read.

Figure 5:
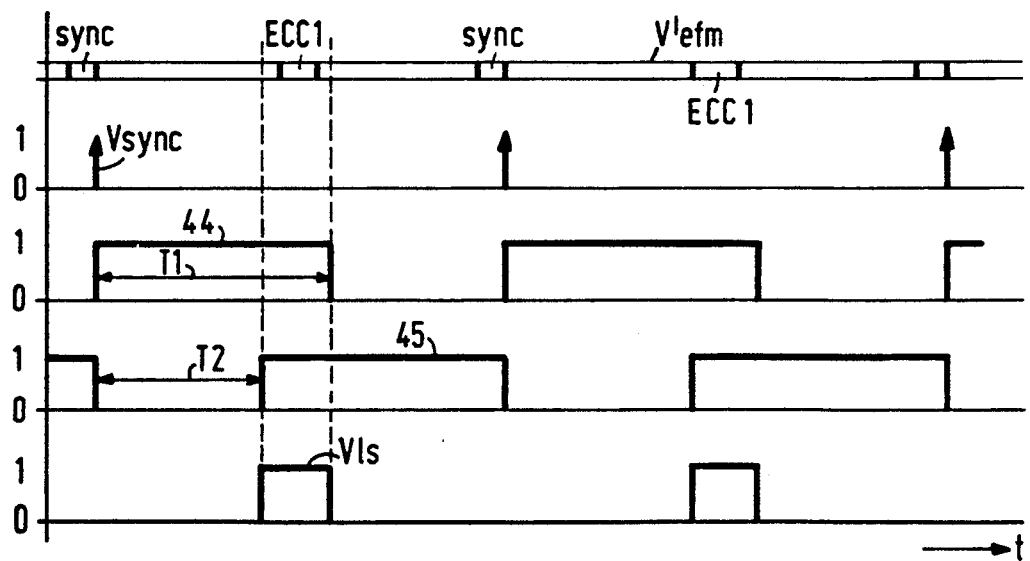
FIG. 5 is a waveform diagram of a number of signals appearing in the device shown in FIGS. 2 and 4.

By way of illustration FIG. 5 represents the signal V'efm, the signal Vsync, the output signals 44 and 45 of the monostable multivibrators 40 and 41, and the control signal Vls as a function of time. The delay times T1 and T2 are selected in such a way that the intervals in which the control signal Vls sets the read/write head 12 to the write mode comprise at least that part of the signal V'efm in which the EFM symbols ECC1 are situated, which symbols serve for the purpose of error correction. Such a choice has the advantage that the portion to be mutilated can be comparatively small because the reduction of the EFM symbols ECC1 has a greater influence on the error correction than the mutilation of the EFM symbols representing the actual data.

The invention has been described in detail for use in recording and reading standard CD signals on/from a write-once optical record carrier. However, the scope of the invention is not limited to such a field of use. In principle, the invention is applicable to all cases where information comprising redundancy for error-correction purposes is recorded on a write-once inscribable record carrier.

Accordingly, those skilled in the art may make numerous changes and modifications from the illustrative embodiments described in the foregoing without departing from the scope of the appended claims.

I claim:

1. An information recording and read device for recording and reading information on/from an inscribable record carrier of a write-once type, the recorded information being adapted for the application of redundancy thereto enabling error correction, the device comprising: recording means for recording an information pattern in a track on the record carrier which pattern is representative of the information to be recorded; reading means for converting the information pattern into an information signal; and control means for controlling the recording and/or reading process on the basis of control information in the track; the reading means comprising a correction circuit for correcting, on the basis of the redundancy in the information, the errors in the information being read and for suppressing the information signal in the case that the correction circuit is not capable of correcting the errors; and the device further comprising means for partly mutilating the recorded information pattern in a selected part of the track, portions with a mutilated information pattern and portions with an undamaged information pattern alternating with each other in a manner such that control on the basis of the control information in the track remains possible even when the error correction circuit is no longer capable of correcting the errors.

2. A device as claimed in claim 1, wherein the means for mutilating the information comprises means for detecting control patterns in the track and responsive to the detection of control patterns to mutilate information patterns in track portions situated at specific locations between the control patterns.

3. A device as claimed in claim 1 wherein the control patterns are situated at equidistant positions in the track, and the means for mutilating information patterns comprises means for scanning the track with a linear scanning velocity and for mutilating information-pattern portions which are scanned in predetermined time intervals after detections of the control patterns.

4. A device as claimed in claim 1, wherein the device is adapted to record standard CD signals.

5. A device as claimed in claim 4, wherein the mutilated portions of the information pattern mainly represent error correction symbols for the purpose of error correction.

6. An information recording device for recording information on an inscribable record carrier of a write-once type, in which the recorded information exhibits redundancy enabling error correction to be applied, the device comprising recording means for recording an information pattern which is representative of the information to be recorded in a track on the record carrier, means for partly mutilating the information pattern in a selected part of the track in such a manner that in the selected part of the track portions with a mutilated information pattern and portions with an undamaged information pattern alternate with each other in a manner such that control on the basis of the control information in the track remains possible but error correction on the basis of the redundancy in the information is not possible.

7. A device as claimed in claim 6, wherein the means for mutilating the information pattern comprise means for detecting control patterns in the track and responsive to the detections of control patterns to mutilate information patterns in track portions situated at specific locations between the control patterns.

8. A device as claimed in claim 6 wherein the control patterns are situated at equidistant position in the track, the means for mutilating information patterns comprises means for scanning the patterns with a linear scanning velocity and for mutilating information-pattern portions which are scanned in predetermined time intervals after detection of the control patterns.

9. A device as claimed in any one of the claim 6, wherein the device is adapted to record standard CD signals.

10. A device as claimed in claim 9, wherein the mutilated portions of the information pattern mainly represent error correction symbols for the purpose of error correction.

11. A record carrier having a track in which an information pattern is formed which represents information which exhibits redundancy on the basis of which error correction is possible, characterized in that the track comprises a part in which portions with a mutilated information pattern and portions with an undamaged information pattern alternate with each other in a manner such that control on the basis of the information in the track remains possible but correction on the basis of the partly mutilated information pattern is not possible.

12. A record carrier as claimed in claim 11, characterized in that the track comprises control patterns, the mutilated information patterns being situated exclusively in track portions between the control patterns.

13. A record carrier as claimed in claim 12, characterized in that the information pattern represents a standard CD signal.

14. A record carrier as claimed in claim 13, characterized in that the positions of the mutilated portions of the information pattern are situated mainly at positions intended for recording error correction symbols for the purpose of error correction.

15. A device as claimed in claim 2, wherein the control patterns are situated at equidistant positions in the track, and the means for mutilating information patterns comprises means for scanning the track with a linear scanning velocity and for mutilating information-pattern portions which are scanned in predetermined time intervals after detections of the control patterns.

16. A device as claimed in claim 7, wherein the control patterns are situated at equidistant position in the track, the means for mutilating information patterns comprises means for scanning the patterns with a linear scanning velocity and for mutilating information-pattern portions which are scanned in predetermined time intervals after detection of the control patterns.

17. A device as claimed in claim 8, wherein the device is adapted to record standard CD signals.

18. A device as claimed in claim 2, wherein the device is adapted to record standard CD signals.

19. A device as claimed in claim 3, wherein the device is adapted to record standard CD signals.

20. A device as claimed in claim 7, wherein the device is adapted to record standard CD signals.

* * * * *